(No Model.)
J. W. EGGLESTON.
BREAST COLLAR.
No. 472,866. Patented Apr. 12, 1892.
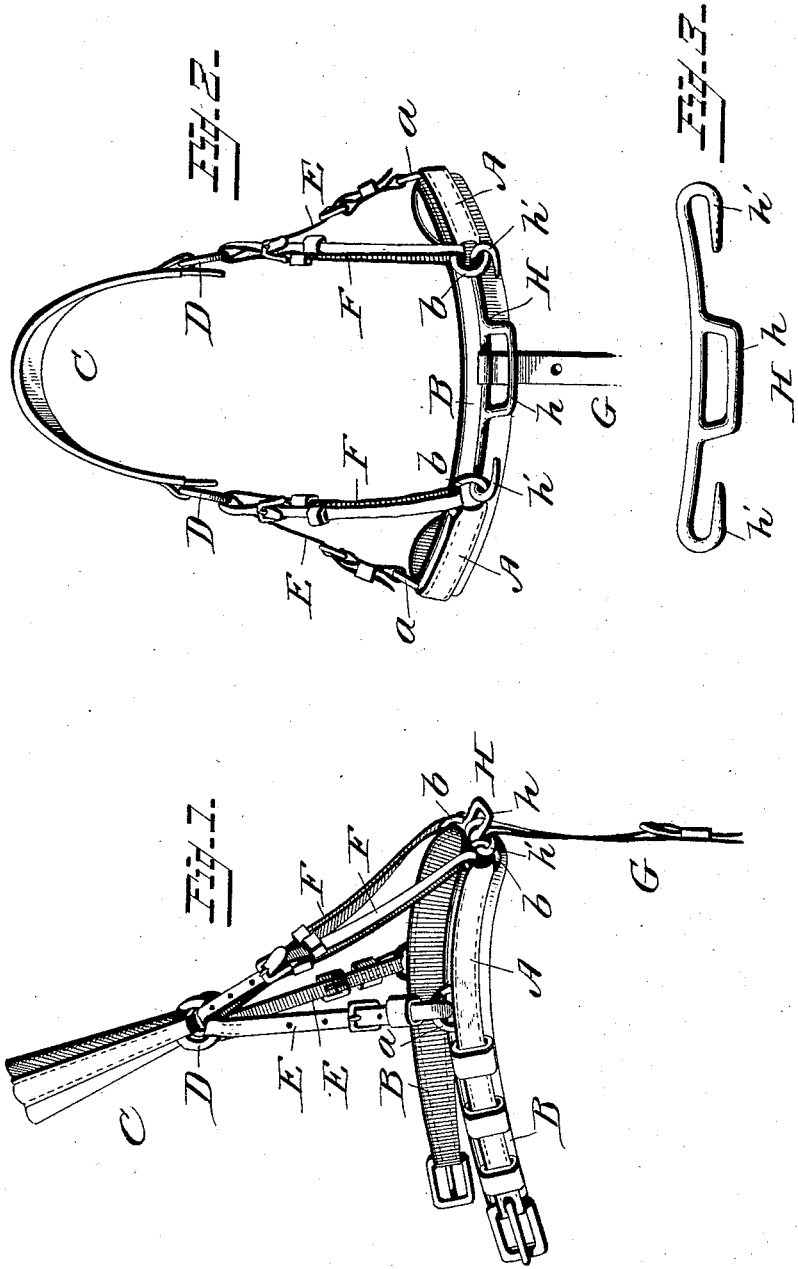
Witnesses
Albert Speiden.
Van Buren Hillyard.
Inventor
Joseph W. Eggleston.
By his Attorneys
R. S. & A. P. Lacey

UNITED STATES PATENT OFFICE.

JOSEPH WILLIAM EGGLESTON, OF ITHACA, NEW YORK.

BREAST-COLLAR.

SPECIFICATION forming part of Letters Patent No. 472,866, dated April 12, 1892.

Application filed August 28, 1891. Serial No. 403,974. (No model.)

*To all whom it may concern:*

Be it known that I, JOSEPH WILLIAM EGGLESTON, a citizen of the United States, residing at Ithaca, in the county of Tompkins and State of New York, have invented certain new and useful Improvements in Harness; and I do hereby declare the following to be a full, clear, and exact description of the invention, such as will enable others skilled in the art to which it appertains to make and use the same.

This invention relates to harness, and has for its object to provide a harness-bail for light double-team harness, to be attached to a breast-collar to obtain a close setting of the same to the horse at all times, and which will obviate a swaying of the pole, and at the same time be adjustable to large and small horses, and be strong, durable, and convenient in its application, facilitating the hitching and the unhitching of the horses.

The improvement consists of the novel features and the peculiar construction and combination of the parts, which will be hereinafter more fully described and claimed, and which are shown in the annexed drawings, in which—

Figure 1 is a perspective view of a collar embodying my invention. Fig. 2 is a front view of the collar. Fig. 3 is a perspective view of the bail.

The breast-collar is composed of tug-straps A, having buckles at their outer ends, to which the tugs (not shown) are to be buckled, and padding B. Rings $b$ are provided at the inner or forward ends of the tug-straps A, and at a short distance from the rings $b$ other rings $a$ are secured to the straps A. The metal bail H is provided at its ends with hooks $h'$ and midway of its ends with the loop $h$ to receive the martingale G, and curves in the direction of its length to conform to the chest of the horse. The neck-pad C is provided at its ends with rings D, and the straps E and F connect the rings D with the rings $a$ and $b$, respectively. In assembling the parts the hooked ends of the bail are engaged with the rings $b$. Obviously the bail can be readily attached to or detached from the collar.

Having thus described my invention, what I claim, and desire to secure by Letters Patent, is—

The herein shown and described breast-collar, composed of the tug-straps A, having rings $b$ at their opposing or forward ends, buckles at their rear ends, and having rings $a$ intermediate of their ends, the padding B, secured to and extending from one extreme end of one tug-strap to the extreme end of the other tug-strap, the neck-pad C, having rings D, and the short straps E and F, connecting the rings D with the rings $a$ and $b$ and having buckles whereby they can be lengthened or shortened, and the metal bail H, having loop $h$ midway of its ends and having hooks $h'$ at its ends, whereby it can be readily attached to or detached from the said rings $b$ to connect or disconnect the tug-straps, substantially as described.

In testimony whereof I affix my signature in presence of two witnesses.

JOSEPH WILLIAM EGGLESTON.

Witnesses:
DAVID M. DEAN,
HANSON C. SMITH.